United States Patent
Li et al.

(10) Patent No.: US 10,142,776 B2
(45) Date of Patent: Nov. 27, 2018

(54) METHOD, DEVICE AND COMMUNICATION SYSTEM FOR PROCESSING COMMON SEARCH AREA

(71) Applicant: Huawei Technologies Co., Ltd., Shenzhen (CN)

(72) Inventors: Yuanjie Li, Shanghai (CN); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/834,902

(22) Filed: Dec. 7, 2017

(65) Prior Publication Data

US 2018/0103345 A1 Apr. 12, 2018

Related U.S. Application Data

(63) Continuation of application No. 14/672,004, filed on Mar. 27, 2015, now Pat. No. 9,848,294, which is a
(Continued)

(51) Int. Cl.
*H04L 12/801* (2013.01)
*H04L 12/28* (2006.01)
(Continued)

(52) U.S. Cl.
CPC ........... *H04W 4/021* (2013.01); *H04L 5/0053* (2013.01); *H04W 72/04* (2013.01);
(Continued)

(58) Field of Classification Search
CPC ....... H04W 4/021; H04W 4/025; H04W 4/30; H04W 72/085; H04W 72/0493; H04L 5/0057
See application file for complete search history.

(56) References Cited

U.S. PATENT DOCUMENTS

| | | | | |
|---|---|---|---|---|
| 2009/0080500 A1* | 3/2009 | Muharemovic | ..... | H04J 13/0062 375/146 |
| 2010/0136993 A1 | 6/2010 | Wen | | |

(Continued)

FOREIGN PATENT DOCUMENTS

| | | |
|---|---|---|
| CN | 101562845 A | 10/2009 |
| CN | 102202324 A | 9/2011 |

(Continued)

OTHER PUBLICATIONS

"Requirements and signalling for configuration of UESSS and CSS on ePDCCH," 3GPP TSG RAN WG1 Meeting #68bis, Jeju, Korea, R1-121199, XP050599496, 3rd Generation Partnership Project, Valbonne, France (Mar. 26-30, 2012).

(Continued)

*Primary Examiner* — Brian Roberts
*Assistant Examiner* — Abu-Sayeed Haque
(74) *Attorney, Agent, or Firm* — Leydig, Voit & Mayer, Ltd.

(57) ABSTRACT

The disclosure provides a method, a device and a communication system for processing a common search area. The method includes: acquiring resource indication information about a first common search area of a control channel, or resource indication information about a first common search area and resource indication information about at least one second common search area; and determining, according to the resource indication information about the first common search area, or the resource indication information about the first common search area and the resource indication information about at least one second common search area, a location of the first common search area, or locations of the first common search area and at least one second common search area.

20 Claims, 2 Drawing Sheets acquiring resource indication information about a first common search area of a control channel, or resource indication information about a first common search area and resource indication information about at least one second common search area — 101 determining, according to the resource indication information about the first common search area, or the resource indication information about the first common search area and the resource indication information about at least one second common search area, a location of the first common search area, or locations of the first common search area and at least one second common search area — 102

Related U.S. Application Data continuation of application No. PCT/CN2012/082393, filed on Sep. 28, 2012.

(51) Int. Cl.
  *H04L 5/14*    (2006.01)
  *H04L 1/00*    (2006.01)
  *H04W 4/021*   (2018.01)
  *H04W 72/04*   (2009.01)
  *H04L 5/00*    (2006.01)

(52) U.S. Cl.
  CPC ... *H04W 72/0413* (2013.01); *H04W 72/0486* (2013.01); *H04L 5/0094* (2013.01)

(56) References Cited

U.S. PATENT DOCUMENTS

| | | | |
|---|---|---|---|
| 2011/0105119 A1* | 5/2011 | Bienas | H04W 36/0055 |
| | | | 455/436 |
| 2011/0170472 A1 | 7/2011 | Noh et al. | |
| 2012/0236814 A1 | 9/2012 | Nishio et al. | |
| 2012/0281576 A1 | 11/2012 | Yamada et al. | |
| 2013/0114521 A1 | 5/2013 | Frenne et al. | |
| 2013/0195067 A1 | 8/2013 | Khoshnevis et al. | |
| 2013/0195068 A1 | 8/2013 | Baker et al. | |
| 2013/0215823 A1* | 8/2013 | Shin | H04L 5/001 |
| | | | 370/328 |
| 2013/0235812 A1* | 9/2013 | Heo | H04L 5/001 |
| | | | 370/329 |
| 2013/0242770 A1 | 9/2013 | Chen et al. | |
| 2013/0242882 A1 | 9/2013 | Blankenship et al. | |
| 2013/0242890 A1* | 9/2013 | He | H04W 72/0413 |
| | | | 370/329 |
| 2014/0086285 A1 | 3/2014 | Yang et al. | |
| 2014/0226615 A1* | 8/2014 | Beale | H04W 28/20 |
| | | | 370/329 |
| 2015/0043392 A1* | 2/2015 | Susitaival | H04L 5/1469 |
| | | | 370/280 |
| 2015/0043457 A1 | 2/2015 | Liu et al. | |
| 2015/0208200 A1 | 7/2015 | Li et al. | |

FOREIGN PATENT DOCUMENTS

| | | |
|---|---|---|
| CN | 102640556 A | 8/2012 |
| CN | 102668671 A | 9/2012 |
| EP | 2713658 A1 | 4/2014 |

OTHER PUBLICATIONS

"3rd Generation Partnership Project; Technical Specification Group Access Network ;Evolved Universal Terrestrial Radio Access (E-UTRA);Physical layer procedures(Release 11)", 3GPP TS 36.213 V11.0.0, XP050649202, 3rd Generation Partnership Project, Valbonne, France (Sep. 2012).

"PRB indication to UE for ePDCCH transmission," 3GPP TSG RAN WG1 Meeting #70, R1-123252, XP050661142, 3rd Generation Partnership Project, Valbonne, France (Aug. 13-17, 2012).

* cited by examiner

METHOD, DEVICE AND COMMUNICATION SYSTEM FOR PROCESSING COMMON SEARCH AREA

CROSS-REFERENCE TO RELATED APPLICATIONS

This application is a continuation of U.S. patent application Ser. No. 14/672,004, filed on Mar. 27, 2015, which is a continuation of International Patent Application No. PCT/CN2012/082393, filed on Sep. 28, 2012. All of the aforementioned patent applications are hereby incorporated by reference in their entireties.

TECHNICAL FIELD

The present disclosure relates to the field of communication technologies and, in particular, to a method, a device and a communication system for processing a common search area.

BACKGROUND

At present, control signaling borne on a physical downlink control channel (PDCCH) needs to be obtained via blindly detecting a search area by a user equipment (UE). The search area thereof may be divided into a common search area and a UE dedicated search area, where the control signaling in the common search area is used for scheduling a system message, a paging message, initial access signaling and bearer power control signaling.

Besides, for a new carrier type (NCT), since there is no traditional control region on the carrier, namely, a PDCCH is not sent, but an enhanced-PDCCH (EPDCCH) is sent, and the EPDCCH which does not contain the common search area only considers the UE dedicated search area. For a NCT which is attached to other carriers, the UE may acquire the control signaling in the common search area by detecting the location of the common search area on the main carrier (not NCT), but for a NCT which is not attached to other traditional carriers, the UE cannot determine the common search area, thereby the control signaling in the common search area cannot be acquired. In addition, a plurality of neighboring cells may use the same cell ID, resulting in an increase in the control signaling which needs to be sent in the common search area, however, the capacity of the common search area is limited, as a result, the control signaling which needs to be sent in the common search area cannot be sent in time, thereby resulting in congestion in the common search area and reducing the transmission efficiency. Therefore, how to design an effective common search area and let the UE be able to determine the location of the common search area is a problem that needs to be solved urgently.

SUMMARY

The present disclosure provides a method, a device and a communication system for processing a common search area, so as to solve the problem in the prior art that a UE is not able to determine the location of a common search area, which is caused by the EPDCCH which does not contain the common search area only considering a UE specific search area, and the problem of congestion of the common search area.

A first aspect of the present disclosure provides a method for processing a common search area, including:

acquiring resource indication information about a first common search area of a control channel, or resource indication information about the first common search area and resource indication information about at least one second common search area;

determining, according to the resource indication information about the first common search area, or the resource indication information about the first common search area and the resource indication information about at least one second common search area, a location of the first common search area, or locations of the first common search area and at least one second common search area.

In a first possible implementation of the first aspect, the resource indication information about the first common search area includes: bandwidth resource information, a number of a physical resource block (PRB) occupied by the first common search area and an initial location of the first common search area;

where the bandwidth resource information is a bandwidth of a carrier; or, a predefined fixed value; or, bandwidth resource information notified through broadcast information or higher layer signaling or physical layer signaling;

the number of the PRB occupied by the first common search area is a number of the PRB occupied by a common search area, where the number of the PRB occupied by the common search area is notified through broadcast information or higher layer signaling or physical layer signaling; or, a predefined parameter;

the initial location of the first common search area is a predefined location; or, an initial location of a common search area determined by a cell identifier; or, an initial location of a common search area notified through broadcast information or higher layer signaling or physical layer signaling.

Combining the first possible implementation of the first aspect, in a second possible implementation of the first aspect, the first common search area is distributed on the bandwidth resource information with an equal interval, a number of a PRB in the interval is $$N = \left\lfloor \frac{N_{RB}^{BW}}{M} - 1 \right\rfloor,$$

where $N_{RB}^{BW}$ is the bandwidth resource information which is denoted with the number of the PRB, M is the number of the PRB occupied by the first common search area.

Combining the first aspect, in a third possible implementation of the first aspect, the resource indication information about the first common search area includes: a PRB interval occupied by the first common search area and an initial location of the first common search area;

where the initial location of the first common search area is a predefined location; or, an initial location of a common search area notified through broadcast information or higher layer signaling or physical layer signaling; or, an initial location of a common search area determined according to a cell identifier;

the PRB interval occupied by the first common search area is a predefined fixed value; or, a PRB interval which is occupied by a common search area and notified through broadcast information or higher layer signaling or physical layer signaling; or, a PRB interval which is occupied by a common search area and determined by the initial location of the first common search area.

Combining the first aspect, in a fourth possible implementation of the first aspect, the resource indication information about the first common search area includes: a resource indication value, a $N_{RB}^{step}$ and an interval currently used by a base station;

where the resource indication value is a resource indication value notified through broadcast information or higher layer signaling or physical layer signaling;

the $N_{RB}^{step}$ is a $N_{RB}^{step}$ notified through broadcast information or higher layer signaling or physical layer signaling; or, a $N_{RB}^{step}$ determined according to a cell identifier; or, a predefined fixed value;

the interval currently used by the base station is an interval which is currently used by a base station and notified through broadcast information or higher layer signaling or physical layer signaling; or, an interval which is currently used by a base station and determined according to the cell identifier; or, a predefined interval.

Combining the first aspect, in a fifth possible implementation of the first aspect, the resource indication information about the first common search area is resource indication information notified through a broadcast message or higher layer signaling or physical layer signaling, the resource indication information is acquired by a base station by adopting a bitmap indicating manner, and the resource indication information includes a location index of a physical resource block where the location of the first common search area locates.

Combining any one of the first aspect to the fifth possible implementation of the first aspect, in a sixth possible implementation of the first aspect, the resource indication information about the second common search area is resource indication information determined according to a preamble index.

Combining any one of the first aspect to the fifth possible implementation of the first aspect, in a seventh possible implementation of the first aspect, the resource indication information about the second common search area is resource indication information notified through a random access response, the resource indication information includes location information of a PRB occupied by the second common search area, or, an index of the second common search area.

Combining any one of the first aspect to the fifth possible implementation of the first aspect, in an eighth possible implementation of the first aspect, the location of the second common search area is a predefined location; or, a location notified through a broadcast message or higher layer signaling or physical layer signaling; or, a location obtained through the location of the first common search area plus an offset value in a frequency domain; or, a location determined according to a cell identifier.

Combining any one of the first aspect to the fifth possible implementation of the first aspect, in a ninth possible implementation of the first aspect, the resource indication information about the second common search area is resource indication information notified by a random access message 3, or an index of the second common search area.

Combining any one of the first aspect to the fifth possible implementation of the first aspect, in a tenth possible implementation of the first aspect, the resource indication information about the second common search area is resource indication information determined according to a RNTI of a user.

Combining any one of the first aspect to the tenth possible implementation of the first aspect, in an eleventh possible implementation of the first aspect, the second common search area is used for a transmission of DCI format 1A; or, the second common search area is used for a transmission of DCI format 1A and DCI format 0; or, the first common search area is used for a transmission of DCI format 1C, and the second common search area is used for a transmission of DCI format 1A and DCI format 0.

A second aspect of the present disclosure provides a method for processing a common search area, including:

determining a location of a first common search area of a control channel, or, determining a location of the first common search area and a location of at least one second common search area;

sending to a UE resource indication information corresponding to the location of the first common search area, or, resource indication information corresponding to the location of the first common search area and resource indication information corresponding to the location of at least one second common search area.

In a first possible implementation of the second aspect, the resource indication information corresponding to the location of the first common search area includes: a bandwidth of a carrier, a number of a PRB occupied by the first common search area and an initial location of the first common search area, then the sending to the UE the resource indication information corresponding to the location of the first common search area includes:

sending to the UE the bandwidth of the carrier, the number of the PRB occupied by the first common search area and the initial location of the first common search area through a broadcast message or higher layer signaling or physical layer signaling.

Combining the second aspect, in a second possible implementation of the second aspect, the resource indication information corresponding to the location of the first common search area includes: a PRB interval occupied by the first common search area and/or an initial location of the first common search area, then the sending to the UE the resource indication information corresponding to the location of the first common search area includes:

sending to the UE the PRB interval occupied by the first common search area and/or the initial location of the first common search area through broadcast information or higher layer signaling or physical layer signaling.

Combining the second aspect, in a third possible implementation of the second aspect, when the resource indication information corresponding to the location of the first common search area includes a resource indication value corresponding to the location of the first common search area, the sending to the UE the resource indication information corresponding to the location of the first common search area includes: sending to the UE the resource indication value corresponding to the location of the first common search area through broadcast information or higher layer signaling or physical layer signaling; or, when the resource indication information corresponding to the location of the first common search area includes a resource indication value and a $N_{RB}^{step}$ which correspond to the location of the first common search area, then the sending to the UE resource the indication information corresponding to the location of the first common search area includes: sending to the UE the resource indication value and the $N_{RB}^{step}$ which correspond to the location of the first common search area through broadcast information or higher layer signaling or physical layer signaling; or, when the resource indication information corresponding to the location of the first common search area includes a resource indication value and a currently used interval which correspond to the location of the first common search area, then the sending to the UE the resource indication information corresponding to the location of the first common search area includes: sending to the UE the resource indication value and the currently used interval which correspond to the location of the first common search area through broadcast information or higher layer signaling or physical layer signaling; or, when the resource indication information corresponding to the location of the first common search area includes a resource indication value, a $N_{RB}^{step}$ and a currently used interval which correspond to the location of the first common search area, then the sending to the UE the resource indication information corresponding to the location of the first common search area includes: sending to the UE the resource indication value, the $N_{RB}^{step}$ and the currently used interval which correspond to the location of the first common search area through broadcast information or higher layer signaling or physical layer signaling.

Combining the second aspect, in a fourth possible implementation of the second aspect, the resource indication information corresponding to the location of the first common search area includes: a location index of a physical resource block where the location of the first common search area locates;

then the sending to the UE the resource indication information corresponding to the location of the first common search area includes:

sending to the UE the resource indication information about the first common search area through a broadcast message or higher layer signaling or physical layer signaling by adopting a bitmap indicating manner.

Combining any one of the second aspect and the fourth possible implementation of the second aspect, in a fifth possible implementation of the second aspect, the resource indication information corresponding to the location of the second common search area includes location information of a PRB occupied by the second common search area, or, an index of the second common search area;

then the sending to the UE the resource indication information corresponding to the location of at least one second common search area, further includes:

sending to the UE the location information of the PRB occupied by at least one second common search area, or a set index number of at least one second common search area through a random access response.

Combining any one of the second aspect and the fourth possible implementation of the second aspect, in a sixth possible implementation of the second aspect, the second common search area is used for a transmission of DCI format 1A; or, the second common search area is used for a transmission of DCI format 1A and DCI format 0; or, the first common search area is used for a transmission of DCI format 1C, and the second common search area is used for a transmission of DCI format 1A and DCI format 0.

A third aspect of the present disclosure provides a device for processing a common search area, including:

an acquiring module, configured to acquire resource indication information about a first common search area of a control channel, or resource indication information about a first common search area and resource indication information about at least one second common search area;

a location determining module, configured to determine, according to the resource indication information about the first common search area, or the resource indication information about the first common search area and the resource indication information about at least one second common search area, a location of the first common search area, or locations of the first common search area and at least one second common search area.

In a first possible implementation of the third aspect, the resource indication information about the first common search area acquired by the acquiring module includes: bandwidth resource information, a number of a PRB occupied by the first common search area and an initial location of the first common search area;

where the bandwidth resource information is a bandwidth of a carrier; or, a predefined fixed value; or, bandwidth resource information notified through broadcast information or higher layer signaling or physical layer signaling;

the number of the PRB occupied by the first common search area is a number of the PRB occupied by a common search area, where the number of the PRB occupied by the common search area is notified through broadcast information or higher layer signaling or physical layer signaling; or, a predefined parameter;

the initial location of the first common search area is a predefined location; or, an initial location of a common search area determined by a cell identifier; or, an initial location of a common search area notified through broadcast information or higher layer signaling or physical layer signaling.

Combining the third aspect, in a second possible implementation of the third aspect, the resource indication information about the first common search area acquired by the acquiring module includes: a PRB interval occupied by the first common search area and an initial location of the first common search area;

where the initial location of the first common search area is a predefined location; or, an initial location of a common search area notified through broadcast information or higher layer signaling or physical layer signaling; or, an initial location of a common search area determined according to a cell identifier;

the PRB interval occupied by the first common search area is a predefined fixed value; or, a PRB interval which is occupied by a common search area and notified through broadcast information or higher layer signaling or physical layer signaling; or, a PRB interval which is occupied by a common search area and determined by the initial location of the first common search area.

Combining the third aspect, in a third possible implementation of the third aspect, the resource indication information about the first common search area acquired by the acquiring module includes: a resource indication value, a $N_{RB}^{step}$ and an interval currently used by a base station;

where the resource indication value is a resource indication value notified through broadcast information or higher layer signaling or physical layer signaling;

the $N_{RB}^{step}$ is a $N_{RB}^{step}$ notified through broadcast information or higher layer signaling or physical layer signaling; or, a $N_{RB}^{step}$ determined according to a cell identifier; or, a predefined fixed value;

the interval currently used by a base station is an interval which is currently used by a base station and notified through broadcast information or higher layer signaling or physical layer signaling; or, an interval which is currently used by a base station and determined according to the cell identifier; or, a predefined interval.

Combining the third aspect, in a fourth possible implementation of the third aspect, the resource indication information about the first common search area acquired by the acquiring module is a resource indication information notified through a broadcast message or higher layer signaling or physical layer signaling, and the resource indication information is acquired by a base station by adopting a bitmap indicating manner.

Combining any one of the third aspect to the fourth possible implementation of the third aspect, in a fifth possible implementation of the third aspect, the resource indication information about a second common search area group acquired by the acquiring module is resource indication information determined according to a preamble index.

Combining any one of the third aspect to the fourth possible implementation of the third aspect, in a sixth possible implementation of the third aspect, the resource indication information about the second common search area acquired by the acquiring module is resource indication information notified through a random access response, and the resource indication information includes location information of a PRB occupied by the second common search area, or, an index of the second common search area.

Combining any one of the third aspect to the fourth possible implementation of the third aspect, in a seventh possible implementation of the third aspect, the location of the second common search area acquired by the acquiring module is a predefined location; or, a location notified through a broadcast message or higher layer signaling or physical layer signaling; or, a location obtained through the location of the first common search area plus an offset value in a frequency domain; or, a location determined according to a cell identifier.

Combining any one of the third aspect to the fourth possible implementation of the third aspect, in an eighth possible implementation of the third aspect, the resource indication information about the second common search area acquired by the acquiring module is resource indication information notified by a random access message 3 or an index of the second common search area.

Combining any one of the third aspect to the fourth possible implementation of the third aspect, in a ninth possible implementation of the third aspect, the resource indication information about the second common search area acquired by the acquiring module is resource indication information determined according to a RNTI of a user.

A fourth aspect of the present disclosure provides a device for processing a common search area, including:

a location determining module, configured to determine a location of a first common search area of a control channel, or, determine a location of the first common search area and a location of at least one second common search area;

a sending module, configured to send to a UE resource indication information corresponding to the location of the first common search area, or, resource indication information corresponding to the location of the first common search area and resource indication information corresponding to the location of at least one second common search area.

In a first possible implementation of the fourth aspect, when the resource indication information corresponding to the location of the first common search area includes: a bandwidth of a carrier, a number of a PRB occupied by the first common search area and an initial location of the first common search area, the sending module is specifically configured to send to the UE the bandwidth of the carrier, the number of the PRB occupied by the first common search area and the initial location of the first common search area through a broadcast message or higher layer signaling or physical layer signaling.

Combining the fourth aspect, in a second possible implementation of the fourth aspect, when the resource indication information corresponding to the location of the first common search area includes: a PRB interval occupied by the first common search area and/or an initial location of the first common search area, the sending module is specifically configured to send to the UE the PRB interval occupied by the first common search area and/or the initial location of the first common search area through broadcast information or higher layer signaling or physical layer signaling.

Combining the fourth aspect, in a third possible implementation of the fourth aspect, when the resource indication information corresponding to the location of the first common search area includes a resource indication value corresponding to the location of the first common search area, the sending module is specifically configured to send to the UE the resource indication value corresponding to the location of the first common search area through broadcast information or higher layer signaling or physical layer signaling; or, when the resource indication information corresponding to the location of the first common search area includes a resource indication value and a $N_{RB}^{step}$ which correspond to the location of the first common search area, the sending module is specifically configured to send to the UE the resource indication value and the $N_{RB}^{step}$ which correspond to the location of the first common search area through broadcast information or higher layer signaling or physical layer signaling; or, when the resource indication information corresponding to the location of the first common search area includes a resource indication value and a currently used interval which correspond to the location of the first common search area, the sending module is specifically configured to send to the UE the resource indication value and the currently used interval which correspond to the location of the first common search area through broadcast information or higher layer signaling or physical layer signaling; or, when the resource indication information corresponding to the location of the first common search area includes a resource indication value, a $N_{RB}^{step}$ and a currently used interval which correspond to the location of the first common search area, the sending module is specifically configured to send to the UE the resource indication value, the $N_{RB}^{step}$ and the currently used interval which correspond to the location of the first common search area through broadcast information or higher layer signaling or physical layer signaling.

Combining the fourth aspect, in a fourth possible implementation of the fourth aspect, when the resource indication information corresponding to the location of the first common search area includes: a location index of a physical resource block where the location of the first common search area locates, the sending module is specifically configured to send to the UE the resource indication information about the first common search area through a broadcast message or higher layer signaling or physical layer signaling by adopting a bitmap indicating manner.

Combining any one of the fourth aspect to the fourth possible implementation of the fourth aspect, in a fifth possible implementation of the fourth aspect, when the resource indication information corresponding to the location of the second common search area includes location information of a PRB occupied by the second common search area, or, a set index number of the second common search area, the sending module is specifically configured to send to the UE location information of a PRB occupied by at least one second common search area, or a set index number of at least one second common search area through a random access response.

A fifth aspect of the present disclosure provides a user equipment, including: a memory, configured to store an instruction;

a processor coupled with the memory, where the processor is configured to execute the instruction stored in the memory, and the processor is configured to execute the method for processing the common search area according to the first aspect.

A sixth aspect of the present disclosure provides a base station, including: a memory, configured to store an instruction;

a processor coupled with the memory, where the processor is configured to execute the instruction stored in the memory, and the processor is configured to execute the method for processing the common search area according to the second aspect.

A seventh aspect of the present disclosure provides a communication system, including: the aforementioned user equipment and the aforementioned base station.

Technical effects of the present disclosure are: the location of the first common search area, or the locations of the first common search area and at least one second common search area are determined via the acquired resource indication information about the first common search area of the control channel, or the resource indication information about the first common search area and the resource indication information about at least one second common search area, thereby solving the problem in the prior art that the UE is not able to determine the location of the common search area, which is caused by the EPDCCH which does not contain the common search area only considering the UE dedicated search area, and the problem of the congestion of the common search area, hence the EPDCCH channel can be received correctly, in the meantime, control signaling of at least one common search area can be acquired timely.

DESCRIPTION OF EMBODIMENTS

Figure 1:
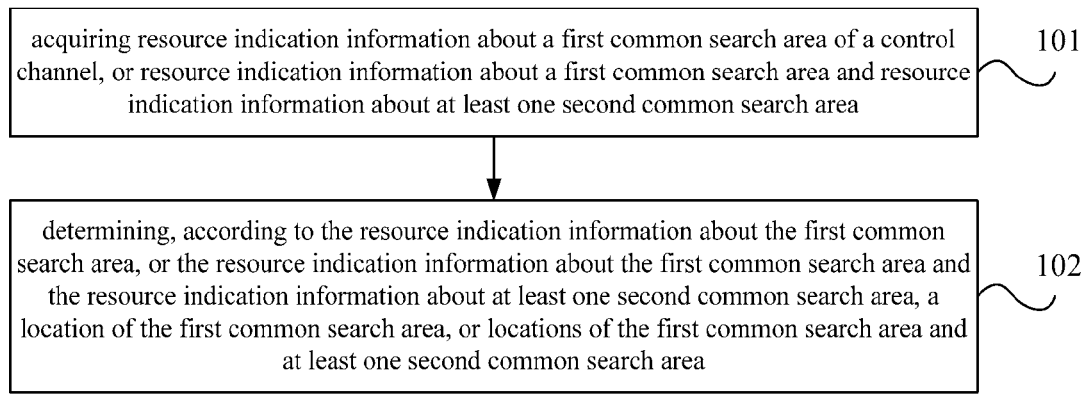
FIG. 1 is a flowchart of a method for processing a common search area according to an embodiment of the present invention.

FIG. 1 is a flowchart of a method for processing a common search area according to an embodiment of the present invention. As shown in FIG. 1, the method of this embodiment includes:

Step 101, acquiring resource indication information about a first common search area of a control channel, or resource indication information about a first common search area and resource indication information about at least one second common search area.

Figure 2:
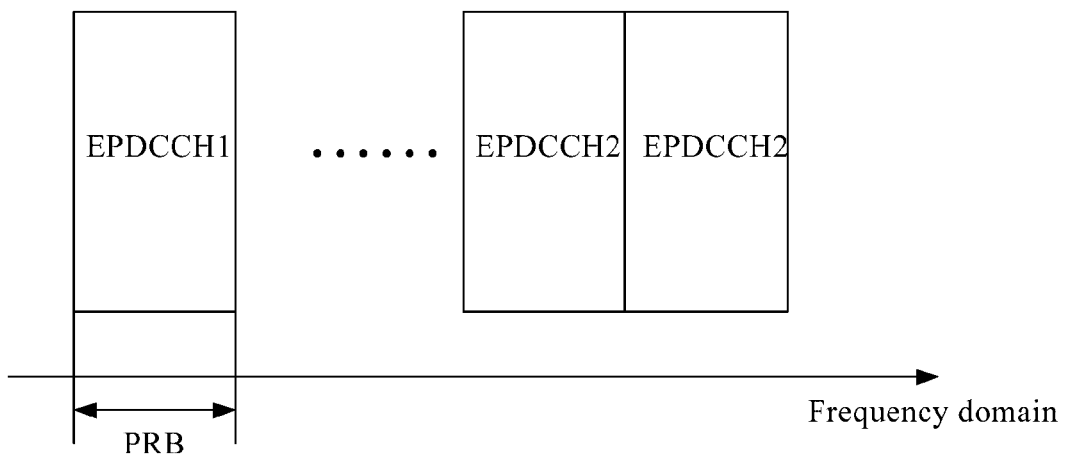
FIG. 2 is a schematic view of transmission of an EPDCCH.

In this embodiment, after initially accessing a carrier, the resource indication information about the first common search area of the control channel, or, the resource indication information about the first common search area and the resource indication information about at least one second common search area can be acquired. Where, the carrier may be specifically a NCT in a R11 version of the LTE, and an EPDCCH, rather than a PDCCH, is sent on this NCT. Where, the EPDCCH is sent in a region of a subframe, which is used for transmitting downlink data, rather than in a control region containing first n symbols of the subframe, and the EPDCCH multiplexes with a PDSCH in the frequency domain by occupying RBs different from the PDSCH. This kind of EPDCCH may perform a precoding transmission like the PDSCH, and demodulate according to a UE specific reference signal (DM RS). Besides, FIG. 2 is a schematic view of transmission of an EPDCCH. As shown in FIG. 2, this EPDCCH has the following characteristics:

1) EPDCCHs of a UE may perform beamforming, where a centralized mapping manner is adopted for physical resources of the EPDCCHs;

2) Physical resource blocks (PRB) occupied by each EPDCCH are within the range of two to three;

3) On account of the blind detection necessary for the EPDCCHs, the location scope of the EPDCCHs in the frequency domain is preset.

Step 102, determining, according to the resource indication information about the first common search area, or the resource indication information about the first common search area and the resource indication information about at least one second common search area, the location of the first common search area, or the locations of the first common search area and at least one second common search area.

In this embodiment, preferably, the control channel may include at least one common search area. When the control channel includes one common search area, this common search area is the first common search area. When the control channel includes two or more than two common search areas, one common search area is the first common search area, other common search areas are the second common search areas. Where, part kinds of message scheduling signaling, message paging signaling, power control signaling and random access signaling may be carried on the first common search area for transmission, and other kinds of signaling may be carried on the second common search area for transmission, so as to avoid a congestion problem in the common search area. For example, the signaling for scheduling a system message is carried on the first common search area for transmission, and the message paging signaling, the power control signaling and the random access signaling are carried on the second common search area for transmission. Or, the signaling for scheduling the system message and the message paging signaling are carried on the first common search area for transmission, and the power control signaling and the random access signaling are carried on the second common search area for transmission.

In the embodiment, the location of the first common search area, or the locations of the first common search area and at least one second common search area are determined via the acquired resource indication information about the first common search area of the control channel, or the resource indication information about the first common search area and the resource indication information about at least one second common search area, thereby solving the problem in the prior art that the UE is not able to determine the location of the common search area, which is caused by the EPDCCH which does not contain the common search area only considering the UE dedicated search area, and the problem of the congestion of the common search area, hence the EPDCCH channel can be received correctly, in the meantime, control signaling of at least one common search area can be acquired timely.

Further, in another embodiment of the present invention, based on the embodiment shown in FIG. 1, the resource indication information about the first common search area includes: bandwidth resource information, the number of a PRB occupied by the first common search area and an initial location of the first common search area.

Where, the bandwidth resource information is a bandwidth of the carrier; or, a predefined fixed value; or, bandwidth resource information notified through broadcast information or higher layer signaling or physical layer signaling;

the number of the PRB occupied by the first common search area is the number of the PRB occupied by a common search area, where the number of the PRB occupied by the common search area is notified through broadcast information or higher layer signaling or physical layer signaling; or, a predefined parameter;

the initial location of the first common search area is a predefined location; or, an initial location of a common search area determined by a cell identifier; or, an initial location of a common search area notified through broadcast information or higher layer signaling or physical layer signaling.

Where, the broadcast information may be a PBCH or an EPBCH and etc.; the higher layer signaling may be RRC signaling and etc.; the physical layer signaling may be an EPCFICH and etc.

It should be noted that, the initial location of the first common search area being the initial location of the common search area determined according to the cell identifier is specifically implemented as:

the cell identifier (Cell ID) is scrambled onto a synchronization sequence PSS/SSS, and the UE acquires the cell identifier after performing the synchronization, then the formula (1) is adopted to determine the initial location $N_{offset}$ of the first common search area:

$$N_{offset} = f(CellID) \quad (1)$$

Where, the $N_{offset}$ may be specifically Cell IDmodN, preferably, the first common search area is distributed on the bandwidth resource information with an equal interval, the number of the PRB in the interval is $$N = \left\lfloor \frac{N_{RB}^{BW}}{M} - 1 \right\rfloor,$$

where, the $N_{RB}^{BW}$ is the bandwidth resource information which is denoted with the number of the PRB, M is the number of the PRB occupied by the common search areas in the first common search area group.

Further, in another embodiment of the present invention, based on the embodiment shown in FIG. 1, the resource indication information about the first common search area, the resource indication information includes: a PRB interval occupied by the first common search area and an initial location of the first common search area;

where the initial location of the first common search area is a predefined location; or, an initial location of a common search area notified through broadcast information or higher layer signaling or physical layer signaling; or, an initial location of a common search area determined according to a cell identifier;

the PRB interval occupied by the first common search area is a predefined fixed value; or, a PRB interval which is occupied by a common search area and notified through broadcast information or higher layer signaling or physical layer signaling; or, a PRB interval which is occupied by a common search area and determined by the initial location of the first common search area.

It should be noted that, the initial location of the first common search area being the initial location of the common search area determined according to the cell identifier is specifically implemented as:

the cell identifier (Cell ID) is scrambled onto a synchronization sequence PSS/SSS, and the UE acquires the cell identifier after performing the synchronization, then the formula (2) is adopted to determine the initial location $N_{offset}$ of the first common search area:

$$N_{offset} = f(CellID) \quad (2)$$

Where, the $N_{offset}$ may be specifically Cell ID mod P. P, which is a fixed value, is the number of the PRB occupied by the first common search area.

Further, in another embodiment of the present invention, based on the embodiment shown in FIG. 1, the resource indication information about the first common search area includes: a resource indication value, a $N_{RB}^{step}$ and an interval currently used by a base station;

where the resource indication value is a resource indication value notified through broadcast information or higher layer signaling or physical layer signaling;

the $N_{RB}^{step}$ is a $N_{RB}^{step}$ notified through broadcast information or higher layer signaling or physical layer signaling; or, a $N_{RB}^{step}$ determined according to a cell identifier; or, a predefined fixed value;

the interval currently used by the base station is an interval which is currently used by the base station and notified through broadcast information or higher layer signaling or physical layer signaling; or, an interval which is currently used by the base station and determined according to the cell identifier; or, a predefined interval.

In this embodiment, the manner in which the resource indication value about the first common search area is acquired is:

firstly, the base station adopts the formula (3) to acquire the initial location $RB_{start}$ of the first common search area:

$$RB_{start} = 0, N_{RB}^{step}, 2N_{RB}^{step}, \ldots, (\lfloor N_{VRB}^{DL}/N_{RB}^{step} \rfloor - 1)N_{RB}^{step} \quad (3)$$

Then, the formula (4) is adopted to acquire the length $L_{CRBs}$ of the first common search area:

$$L_{CRBs} =, N_{RB}^{step}, 2N_{RB}^{step}, \ldots, (\lfloor N_{VRB}^{DL}/N_{RB}^{step} \rfloor) N_{RB}^{step} \quad (4)$$

Finally, the formula (5) is adopted to acquire an indication value RIV of the first common search area:

$$RIV = N_{VRB}^{'DL}(L_{CRBs}'-1) + RB_{start}' \quad (5)$$

Where, $L_{CRBs}' = L_{CRBs}/N_{RB}^{step}, RB_{start}' = RB_{start}/N_{RB}^{step}, N_{VRB}^{'DL} = \lfloor N_{VRB}^{DL}/N_{RB}^{step} \rfloor$.

When $N_{gap} = N_{gap,1}, N_{VRB}^{DL} = N_{VRB,gap1}^{DL} = 2 \min (N_{gap}, N_{RB}^{DL} - N_{gap})$;

when $N_{gap} = N_{gap,2}, N_{VRB}^{DL} = N_{VRB,gap2}^{DL} = \lfloor N_{VRB}^{DL}/2N_{gap} \rfloor \cdot 2N_{gap}$.

Besides, values of the intervals $N_{gap}$, $N_{RB}^{DL}$ and $N_{RB}^{step}$ may be determined by a first mapping table and a second mapping table in the protocol. Where, the first mapping table of the intervals $N_{gap}$ and $N_{RB}^{DL}$ is shown in Table 1, and the second mapping table of the intervals $N_{RB}^{DL}$ and $N_{RB}^{step}$ is shown in Table 2.

TABLE 1

| System BW ($N_{RB}^{DL}$) | Gap ($N_{gap}$) | |
| --- | --- | --- |
| | 1st Gap ($N_{gap,1}$) | 2nd Gap ($N_{gap,2}$) |
| 6-10 | $[N_{RB}^{DL}/2]$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

TABLE 2

| System BW ($N_{RB}^{DL}$) | Gap ($N_{gap}$) 1st Gap ($N_{gap,1}$) |
| --- | --- |
| 6-49 | 2 |
| 50-110 | 4 |

Further, in another embodiment of the present invention, based on the embodiment shown in FIG. 1, the resource indication information about the first common search area is resource indication information notified through a broadcast message or higher layer signaling or physical layer signaling, the resource indication information is acquired by a base station by adopting a bitmap indicating manner, and the resource indication information includes a location of a physical resource block where the location of the first common search area locates.

For example, the base station adopting the bitmap indicating manner to acquire the resource indication information is specifically implemented as: adopting the bitmap indicating manner, setting location indication of the physical resource block where the first common search area locates to be 1, and setting locations of other physical resource blocks to be 0, then a user terminal determines the location of the first common search area according to the location indication 1 or the location indication 0.

Further, in another embodiment of the present invention, based on the embodiment shown in FIG. 1, for each second common search area, the resource indication information about the second common search area is resource indication information determined according to a preamble index.

For example, take one second common search area as an example, the preamble index is n, the index of the second common search area where the UE locates (namely the resource indication information) is: $N_{css}$=f(n), specifically, $N_{css}$=(n mod(K))+1, $N_{css}$=1,2,3 . . . ; K represents the number of the second common search area apart from the first common search area.

Further, in another embodiment of the present invention, based on the embodiment shown in FIG. 1, the resource indication information about the second common search area is resource indication information notified through a random access response, and the resource indication information includes location information of the PRB occupied by the second common search area, or, an index of the second common search area.

Further, in another embodiment of the present invention, based on the embodiment shown in FIG. 1, the location of the second common search area is a predefined location; or, a location notified through a broadcast message or higher layer signaling or physical layer signaling; or, a location obtained through the location of the first common search area plus an offset value in the frequency domain; or, a location determined according to a cell identifier.

Further, in another embodiment of the present invention, based on the embodiment shown in FIG. 1, the resource indication information about the second common search area is resource indication information notified by a random access message 3 or an index of the second common search area.

Further, in another embodiment of the present invention, based on the embodiment shown in FIG. 1, the resource indication information about the second common search area is resource indication information determined according to a RNTI of a user.

For example, take one second common search area as an example, the RNTI of the UE is n, the index of the second common search area where the UE locates is: $N_{CSS}$=f(n).

Specifically, $N_{CSS}$=(n mod(K))+1 or $N_{CSS}$=(n mod(K)), where $N_{CSS}$=1, 2, . . . , and K represents the number of the second common search area apart from the first common search area.

Further, in another embodiment of the present invention, based on the aforementioned embodiments, the second common search area is used for a transmission of downlink control information of format 1A (DCI format 1A);

or, the second common search area is used for a transmission of DCI format 1A and downlink control information of format 0 (DCI format 0); or, the first common search area is used for a transmission of downlink control information of format 1C (DCI format 1C), and the second common search area is used for a transmission of DCI format 1A and DCI format 0.

Figure 3:
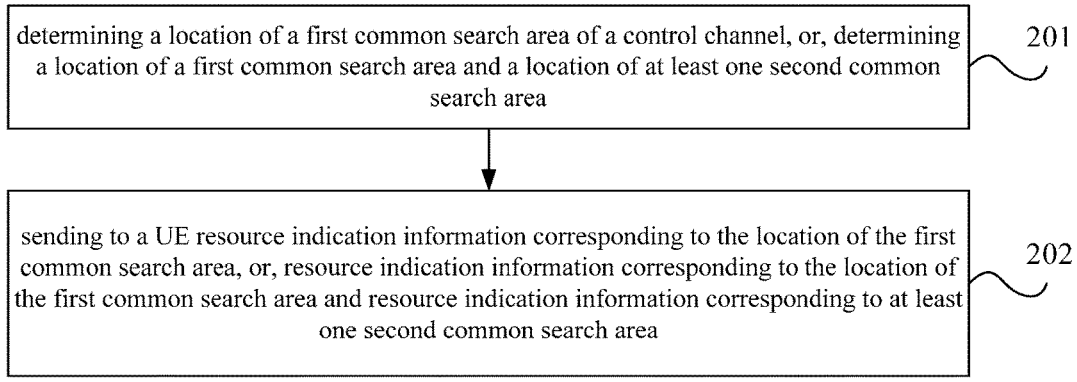
FIG. 3 is a flowchart of a method for processing a common search area according to another embodiment of the present invention.

FIG. 3 is a flowchart of a method for processing a common search area according to another embodiment of the present invention. As shown in FIG. 3, the executive entity of the embodiment is a base station, the method includes:

Step 201, determining a location of a first common search area of a control channel, or, determining a location of a first common search area and a location of at least one second common search area.

Step 202, sending to a UE resource indication information corresponding to the location of the first common search area, or, resource indication information corresponding to the location of the first common search area and resource indication information corresponding to the location of at least one second common search area.

In this embodiment, the UE may execute the technical solution of the method embodiment as shown in FIG. 1, and the implementing principles are similar, which will not be repeated here.

Besides, in this embodiment, preferably, the control channel may include at least one common search area. When the control channel includes one common search area, this common search area is the first common search area. When the control channel includes two or more than two common search areas, one common search area is the first common search area, and other common search areas are the second common search areas. Where, part kinds of message scheduling signaling, message paging signaling, power control signaling and random access signaling may be carried on the first common search area for transmission, and other kinds of signaling may be carried on the second common search area for transmission, so as to avoid a congestion problem in the common search area. For example, the signaling for scheduling a system message is carried on the first common search area for transmission, and the message paging signaling, the power control signaling and the random access signaling are carried on the second common search area for transmission. Or, the signaling for scheduling the system message and the message paging signaling are carried on the first common search area for transmission, and the power control signaling and the random access signaling are carried on the second common search area for transmission.

In the embodiment, by determining the location of the first common search area of the control channel, or, determining the location of the first common search area and the location of at least one second common search area, and sending to the UE the resource indication information corresponding to the location of the first common search area, or, the resource indication information corresponding to the location of the first common search area and the resource indication information corresponding to the location of at least one second common search area, the UE can determine the location of the first common search area, or the location of the first common search area and the location of at least one second common search area via the resource indication information corresponding to the location of the first common search area, or the resource indication information corresponding to the location of the first common search area and the resource indication information corresponding to the location of at least one second common search area, thereby solving the problem in the prior art that the UE is not able to determine the location of the common search area, which is caused by the EPDCCH which does not contain the common search area only considering the UE dedicated search area, and the problem of the congestion of the common search area, hence the EPDCCH channel can be received correctly, in the meantime, control signaling of at least one common search area can be acquired timely.

Further, in another embodiment of the present invention, based on the embodiment shown in FIG. 3, the resource indication information corresponding to the location of the first common search area includes: a bandwidth of a carrier, the number of a PRB occupied by the first common search area and an initial location of the first common search area, then a specific implementation of the sending to the UE the resource indication information corresponding to the location of the first common search area in step 202 is:

sending to the UE the bandwidth of the carrier, the number of the PRB occupied by the first common search area and the initial location of the first common search area through a broadcast message or higher layer signaling or physical layer signaling.

Further, in another embodiment of the present invention, based on the embodiment shown in FIG. 3, the resource indication information corresponding to the location of the first common search area includes: a PRB interval occupied by the first common search area and/or an initial location of the first common search area, then another specific implementation of the sending to the UE the resource indication information corresponding to the location of the first common search area in step 202 is:

sending to the UE the PRB interval occupied by the first common search area and/or the initial location of the first common search area through broadcast information or higher layer signaling or physical layer signaling.

Further, in another embodiment of the present invention, based on the embodiment shown in FIG. 3, a specific implementation of the determining the location of the first common search area of the control channel in step 201 is:

acquiring, according to an initial location and the length of the first common search area, a resource indication value corresponding to the location of the first common search area, and determining, according to the resource indication value corresponding to the location of the first common search area, the location of the first common search area.

Specifically, a specific implementation of the acquiring, according to the initial location and the length of the first common search area, the resource indication value corresponding to the location of the first common search area is:

inquiring a first mapping table of a preset interval and $N_{RB}^{DL}$, and a second mapping table of $N_{RB}^{DL}$ and $N_{RB}^{step}$, acquiring the initial location and the length of the first common search area;

acquiring, according to the initial location and the length of the first common search area, the resource indication value of the first common search area.

For example, firstly adopting the formula (3) to acquire the initial location $RB_{start}$ of the first common search area:

$$RB_{start} = 0, N_{RB}^{step}, 2N_{RB}^{step}, \ldots, (\lfloor N_{VRB}^{DL}/N_{RB}^{step} \rfloor - 1)N_{RB}^{step} \quad (3)$$

Then, adopting the formula (4) to acquire the length $L_{cRBs}$ of the first common search area:

$$L_{CRBs} = N_{RB}^{step}, 2N_{RB}^{step}, \ldots, (\lfloor N_{VRB}^{DL}/N_{RB}^{step} \rfloor) N_{RB}^{step} \quad (4)$$

Finally, adopting the formula (5) to acquire the indication value RIV of the first common search area:

$$RIV = N_{VRB}^{'DL}(L_{CRBs}' - 1) + RB_{start}' \quad (5)$$

Where, $L_{CRBs}' = L_{CRBs}/N_{RB}^{step}, RB_{start}' = RB_{start}/N_{RB}^{step}, N_{VRB}^{'DL} = \lfloor N_{VRB}^{DL}/N_{RB}^{step} \rfloor$.

When $N_{gap} = N_{gap,1}, N_{VRB}^{DL} = N_{VRB,gap1}^{DL} = 2 \min(N_{gap}, N_{RB}^{DL} - N_{gap})$;

when $N_{gap} = N_{gap,2}, N_{VRB}^{DL} = N_{VRB,gap2}^{DL} = \lfloor N_{VRB}^{DL}/2N_{gap} \rfloor \cdot 2N_{gap}$.

Besides, values of the intervals $N_{gap}$, $N_{RB}^{DL}$ and $N_{RB}^{step}$ may be determined by the first mapping table and the second mapping table in the protocol. Where, the first mapping table of the intervals $N_{gap}$ and $N_{RB}^{step}$ is shown in the aforementioned Table 1, and the second mapping table of the intervals $N_{RB}^{DL}$ and $N_{RB}^{step}$ is shown in the aforementioned Table 2.

Then another specific implementation of the sending to the UE the resource indication information corresponding to the location of the first common search area in step 202 is:

sending to the UE the resource indication value corresponding to the location of the first common search area through broadcast information or higher layer signaling or physical layer signaling; or, sending to the UE the resource indication value, the $N_{RB}^{step}$ and the currently used interval which correspond to the location of the first common search area through broadcast information or higher layer signaling or physical layer signaling.

Further, in another embodiment of the present invention, based on the embodiment shown in FIG. 3, the resource indication information corresponding to the location of the first common search area includes: a location index of a physical resource block where the location of the first common search area locates.

Then another specific implementation of the sending to the UE the resource indication information about the first common search area in step 202 is:

sending to the UE the resource indication information about the first common search area through a broadcast message or higher layer signaling or physical layer signaling by adopting a bitmap indicating manner.

Further, in another embodiment of the present invention, based on the embodiment shown in FIG. 3, the resource indication information corresponding to the location of the second common search area includes location information of a PRB occupied by the second common search area, or, an index of the second common search area;

then a specific implementation of the sending to the UE the resource indication information corresponding to the location of at least one second common search area in step 202 is:

sending to the UE the location information of the PRB occupied by at least one second common search area, or the index of the second common search area through a random access response.

Further, in another embodiment of the present invention, based on the embodiment shown in FIG. 3, the second common search area is used for a transmission of DCI format 1A; or, the second common search area is used for a transmission of DCI format 1A and DCI format 0; or, the first common search area is used for a transmission of DCI format 1C, and the second common search area is used for a transmission of DCI format 1A and DCI format 0.

Persons of ordinary skill in the art may understand that all or part of the steps in the above method embodiments may be implemented by a program instructing relevant hardware. The program may be stored in a computer readable storage medium. When the program is run, the foregoing steps in the method embodiments are performed. The storage medium may be any medium capable of storing program codes, such as a ROM, a RAM, a magnetic disk, or an optical disk.

Figure 4:
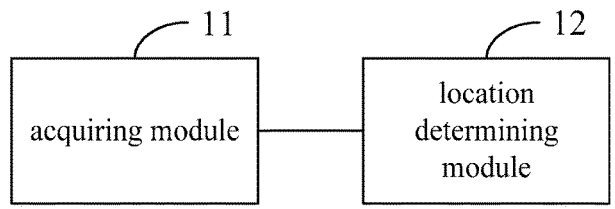
FIG. 4 is a schematic structural diagram of a device for processing a common search area according to an embodiment of the present invention.

FIG. 4 is a schematic structural diagram of a device for processing a common search area according to an embodiment of the present invention. As shown in FIG. 4, the device may be specifically a user terminal, this device includes: an acquiring module 11 and a location determining module 12, where, the acquiring module 11 is configured to acquire resource indication information about a first common search area of a control channel, or resource indication information about a first common search area and resource indication information about at least one second common search area; the location determining module 12 is configured to determine, according to the resource indication information about the first common search area, or the resource indication information about the first common search area and the resource indication information about at least one second common search area, a location of the first common search area, or locations of the first common search area and at least one second common search area.

The device for processing the common search area in the embodiment may execute the technical solution of the method embodiment as shown in FIG. 1, and the implementing principles are similar, which will not be repeated here.

In the embodiment, the location of the first common search area, or the location of the first common search area and the location of at least one second common search area is determined via the acquired resource indication information about the first common search area of the control channel, or the resource indication information about the first common search area and resource indication information about at least one second common search area, thereby solving the problem in the prior art that the UE is not able to determine the location of the common search area, which is caused by the EPDCCH which does not contain the common search area only considering the UE dedicated search area, and the problem of the congestion of the common search area, hence the EPDCCH channel can be received correctly, in the meantime, control signaling of at least one common search area can be acquired timely.

Further, in another embodiment of the present invention, based on the embodiment shown in FIG. 4, the resource indication information about the first common search area acquired by the acquiring module 11 includes: bandwidth resource information, the number of a PRB occupied by the first common search area and an initial location of the first common search area;

where the bandwidth resource information is a bandwidth of the carrier; or, a predefined fixed value; or, bandwidth resource information notified through broadcast information or higher layer signaling or physical layer signaling;

the number of the PRB occupied by the first common search area is the number of the PRB occupied by a common search area, where the number of the PRB occupied by the common search area is notified through broadcast information or higher layer signaling or physical layer signaling; or, a predefined parameter;

the initial location of the first common search area is a predefined location; or, an initial location of a common search area determined by a cell identifier; or, an initial location of a common search area notified through broadcast information or higher layer signaling or physical layer signaling.

Further, in another embodiment of the present invention, based on the embodiment shown in FIG. 4, the resource indication information about the first common search area acquired by the acquiring module 11 includes: a PRB interval occupied by the first common search area and an initial location of the first common search area;

where the initial location of the first common search area is a predefined location; or, an initial location of a common search area notified through broadcast information or higher layer signaling or physical layer signaling; or, an initial location of a common search area determined according to a cell identifier;

the PRB interval occupied by the first common search area is a predefined fixed value; or, a PRB interval which is occupied by a common search area and notified through broadcast information or higher layer signaling or physical layer signaling; or, a PRB interval which is occupied by a common search area and determined by the initial location of the first common search area.

Further, in another embodiment of the present invention, based on the embodiment shown in FIG. 4, the resource indication information about the first common search area acquired by the acquiring module 11 includes: a resource indication value, a $N_{RB}^{step}$ and an interval currently used by a base station;

where the resource indication value is a resource indication value notified through broadcast information or higher layer signaling or physical layer signaling;

the $N_{RB}^{step}$ is a $N_{RB}^{step}$ notified through broadcast information or higher layer signaling or physical layer signaling; or, a $N_{RB}^{step}$ determined according to a cell identifier; or, a predefined fixed value;

the interval currently used by the base station is an interval which is currently used by the base station and notified through broadcast information or higher layer signaling or physical layer signaling; or, an interval which is currently used by the base station and determined according to the cell identifier; or, a predefined interval.

Further, in another embodiment of the present invention, based on the embodiment shown in FIG. 4, the resource indication information about the first common search area acquired by the acquiring module 11 is resource indication information notified through a broadcast message or higher layer signaling or physical layer signaling, and the resource indication information is acquired by the base station by adopting a bitmap indicating manner.

Further, in another embodiment of the present invention, based on the embodiment shown in FIG. 4, the resource indication information about the second common search area group acquired by the acquiring module 11 is resource indication information determined according to a preamble index.

Further, in another embodiment of the present invention, based on the embodiment shown in FIG. 4, the resource indication information about the second common search area acquired by the acquiring module 11 is resource indication information notified through a random access response, and the resource indication information includes location information of a PRB occupied by the second common search area, or, an index of the second common search area.

Further, in another embodiment of the present invention, based on the embodiment shown in FIG. 4, the location of the second common search area acquired by the acquiring module 11 is a predefined location; or, a location notified through a broadcast message or higher layer signaling or physical layer signaling; or, a location obtained through the location of the first common search area plus an offset value in the frequency domain; or, a location determined according to a cell identifier.

Further, in another embodiment of the present invention, based on the embodiment shown in FIG. 4, the resource indication information about the second common search area acquired by the acquiring module 11 is resource indication information notified by a random access message 3 or an index of the second common search area.

Further, in another embodiment of the present invention, based on the embodiment shown in FIG. 4, the resource indication information about the second common search area acquired by the acquiring module 11 is resource indication information determined according to a RNTI of a user.

Figure 5:
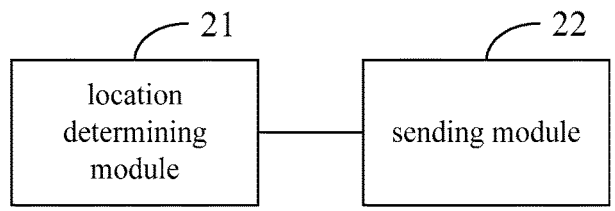
FIG. 5 is a schematic structural diagram of a device for processing a common search area according to another embodiment of the present invention.

FIG. 5 is a schematic structural diagram of a device for processing a common search area according to another embodiment of the present invention. As shown in FIG. 5, the device in this embodiment may be a base station, the device includes: a location determining module 21 and a sending module 22, where, the location determining module 21 is configured to determine a location of a first common search area of a control channel, or, determine a location of the first common search area and a location of at least one second common search area; the sending module 22 is configured to send to a UE resource indication information corresponding to the location of the first common search area, or, resource indication information corresponding to the location of the first common search area and resource indication information corresponding to the location of at least one second common search area.

The device for processing the common search area in the embodiment may execute the technical solution of the method embodiment as shown in FIG. 3, and the implementing principles are similar, which will not be repeated here.

By determining the location of the first common search area of the control channel, or, determining the location of the first common search area and the location of at least one second common search area, and sending to the UE the resource indication information corresponding to the location of the first common search area, or, the resource indication information corresponding to the location of the first common search area and the resource indication information corresponding to the location of at least one second common search area, the UE can determine, according to the resource indication information corresponding to the location of the first common search area, or according to the resource indication information corresponding to the location of the first common search area and the resource indication information corresponding to the location of at least one second common search area, the location of the first common search area, or the location of the first common search area and the location of at least one second common search area, thereby solving the problem in the prior art that the UE is able to determine the location of the common search area, which is caused by the EPDCCH which does not contain the common search area only considering the UE dedicated search area, and the problem of the congestion of the common search area, hence the EPDCCH channel can be received correctly, in the meantime, control signaling of at least one common search area can be acquired timely.

Further, in another embodiment of the present invention, based on the embodiment shown in FIG. 5, when the resource indication information corresponding to the location of the first common search area includes: a bandwidth of a carrier, the number of a PRB occupied by the first common search area and an initial location of the first common search area, the sending module 22 is specifically configured to send to the UE the bandwidth of the carrier, the number of the PRB occupied by the first common search area and the initial location of the first common search area through a broadcast message or higher layer signaling or physical layer signaling.

Further, in another embodiment of the present invention, based on the embodiment shown in FIG. 5, when the resource indication information corresponding to the location of the first common search area includes: a PRB interval occupied by the first common search area and/or an initial location of the first common search area, the sending module 22 is specifically configured to send to the UE the PRB interval occupied by the first common search area and/or the initial location of the first common search area through broadcast information or higher layer signaling or physical layer signaling.

Further, in another embodiment of the present invention, based on the embodiment shown in FIG. 5, the location determining module 21 is specifically configured to acquire, according to an initial location and the length of the first common search area, a resource indication value corresponding to the location of the first common search area, and determine, according to the resource indication value corresponding to the location of the first common search area, the location of the first common search area;

then the sending module 22 is specifically configured to send to the UE the resource indication value corresponding to the location of the first common search area; or send to the UE the resource indication value, the $N_{RB}^{step}$ and the currently used interval which correspond to the location of the first common search area through broadcast information or higher layer signaling or physical layer signaling.

Further, in another embodiment of the present invention, based on the embodiment shown in FIG. 5, when the resource indication information corresponding to the location of the first common search area includes: a location index of a physical resource block where the location of the first common search area locates, the sending module 22 is specifically configured to send to the UE the resource indication information about the first common search area through a broadcast message or higher layer signaling or physical layer signaling by adopting a bitmap indicating manner.

Further, in another embodiment of the present invention, based on the embodiment shown in FIG. 5, when the resource indication information corresponding to the location of the second common search area includes location information of a PRB occupied by the second common search area, or, a set index number of the second common search area, the sending module 22 is specifically configured to send to the UE the location information of the PRB occupied by at least one second common search area, or a set index number of at least one second common search area through a random access response.

The present disclosure also provides a user equipment, including: a memory, configured to store an instruction;

a processor coupled with the memory, where the processor is configured to execute the instruction stored in the memory, and the processor is configured to execute the method for processing the common search area according to FIG. 1.

The present disclosure also provides a base station, including: a memory, configured to store an instruction;

a processor coupled with the memory, where the processor is configured to execute the instruction stored in the memory, and the processor is configured to execute the method for processing the common search area according to FIG. 3.

The present disclosure also provides a communication system, including: the aforementioned user equipment and the aforementioned base station.

Finally, it should be noted that the foregoing embodiments are merely intended for describing the technical solutions of the present disclosure other than limiting the present invention. Although the present disclosure is described in detail with reference to the foregoing embodiments, a person of ordinary skill in the art should understand that he may still make modifications to the technical solutions described in the foregoing embodiments, or make equivalent replacements to some or all of technical features thereof, without departing from the scope of the technical solutions of the embodiments of the present invention.

What is claimed is:

1. A method for processing a common search area at a terminal side device, comprising:
acquiring a first resource indication information about a first common search area from a broadcast message and a second resource indication information about at least one second common search area from a high layer signaling, wherein the high layer signaling is a radio resource control (RRC) signaling;
determining according to the first resource indication information, a location of the first common search area; and
determining according to the second resource indication information, a location of the at least one second common search area;
wherein the first common search area carries at least one type of control signaling and the at least one second common search area carriers a different type of control signaling.

2. The method according to claim 1,
wherein the first resource indication information comprises at least one of: bandwidth resource information, a number of a physical resource block (PRB) occupied by the first common search area and a location of the first common search area.

3. The method according to claim 1,
wherein the second resource indication information comprises location information of a physical resource block (PRB) occupied by the at least one second common search area.

4. The method according to claim 1,
wherein the at least one type of control signaling comprises signaling for scheduling a system information and signaling for message paging, and the different type of control signaling comprises random access signaling.

5. The method according to claim 1, wherein the terminal side device is a user equipment (UE) device or a processor at the UE.

6. An apparatus, comprising a processing circuit and a memory having executable instructions stored therein, wherein execution of the executable instructions by the processing circuit causes the processing circuit to:
acquire a first resource indication information about a first common search area from a broadcast message and a second resource indication information about at least one second common search area from a high layer signaling, wherein the high layer signaling is a radio resource control (RRC) signaling;
determine according to the first resource indication information, a location of the first common search area; and
determine according to the second resource indication information, a location of the at least one second common search area;
wherein the first common search area carries at least one type of control signaling and the at least one second common search area carriers a different type of control signaling.

7. The apparatus according to claim 6,
wherein the first resource indication information comprises at least one of: bandwidth resource information, a number of a physical resource block (PRB) occupied by the first common search area and a location of the first common search area.

8. The apparatus according to claim 6,
wherein the second resource indication information comprises location information of a physical resource block (PRB) occupied by the at least one second common search area.

9. The apparatus according to claim 6,
wherein the at least one type of control signaling comprises signaling for scheduling a system information and signaling for message paging, and the different type of control signaling comprises random access signaling.

10. The apparatus according to claim 6, wherein the apparatus is a user equipment (UE) device or a processor at the UE.

11. A method for processing a common search area at a network side device, comprising:
determining a location of a first common search area and a location of at least one second common search area;

transmitting a first resource indication information about the first common search area through a broadcast message; and transmitting a second resource indication information about the at least one second common search area through a high layer signaling, wherein the high layer signaling is a radio resource control (RRC) signaling;

wherein the first common search area carries at least one type of control signaling and the at least one second common search area carriers a different type of control signaling.

12. The method according to claim 11, wherein the first resource indication information comprises at least one of: bandwidth resource information, a number of a physical resource block (PRB) occupied by the first common search area and a location of the first common search area.

13. The method according to claim 11, wherein the second resource indication information comprises location information of a physical resource block (PRB) occupied by the at least one second common search area.

14. The method according to claim 11, wherein the at least one type of control signaling comprises signaling for scheduling a system information and signaling for message paging, and the different type of control signaling comprises random access signaling.

15. The method according to claim 11, wherein the network side device is a base station or a processor at the base station.

16. An apparatus, comprising: a processing circuit, a transmitter and a memory having executable instructions stored therein, wherein execution of the executable instructions causes:

the processing circuit to determine a location of a first common search area and a location of at least one second common search area;

the transmitter to transmit a first resource indication information about a first common search area through a broadcast message; and the transmitter to transmit a second resource indication information about at least one second common search area through a high layer signaling, wherein the high layer signaling is a radio resource control (RRC) signaling;

wherein the first common search area carries at least one type of control signaling and the at least one second common search area carriers a different type of control signaling.

17. The apparatus according to claim 16, wherein the first resource indication information comprises at least one of: bandwidth resource information, a number of a physical resource block (PRB) occupied by the first common search area and a location of the first common search area.

18. The apparatus according to claim 16, wherein the second resource indication information comprises location information of a physical resource block (PRB) occupied by the at least one second common search area.

19. The apparatus according to claim 16, wherein the at least one type of control signaling comprises signaling for scheduling a system information and signaling for message paging, and the different type of control signaling comprises random access signaling.

20. The apparatus according to claim 16, wherein the apparatus is a base station or a processor at the base station.

* * * * *